US012627761B2

(12) United States Patent
Hong

(10) Patent No.: US 12,627,761 B2
(45) Date of Patent: May 12, 2026

(54) METHODS AND DEVICES FOR POLICY CONTROL FUNCTION NETWORK ELEMENT SELECTION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 296 days.

(21) Appl. No.: 18/283,964

(22) PCT Filed: Mar. 31, 2021

(86) PCT No.: PCT/CN2021/084756
§ 371 (c)(1),
(2) Date: Sep. 25, 2023

(87) PCT Pub. No.: WO2022/205231
PCT Pub. Date: Oct. 6, 2022

(65) Prior Publication Data
US 2024/0056530 A1     Feb. 15, 2024

(51) Int. Cl.
*H04W 72/04*     (2023.01)
*H04M 15/00*     (2006.01)
*H04W 36/14*     (2009.01)
*H04W 60/04*     (2009.01)

(52) U.S. Cl.
CPC ......... *H04M 15/66* (2013.01); *H04W 36/142* (2023.05); *H04W 60/04* (2013.01)

(58) Field of Classification Search
None
See application file for complete search history.

(56)         References Cited

U.S. PATENT DOCUMENTS 11,564,115 B2 *   1/2023   Zong ................... H04W 28/088
2021/0211904 A1 *  7/2021   Zong ....................... H04W 8/08

FOREIGN PATENT DOCUMENTS

CN          110944361 A      3/2020
WO      WO 2019114722 A1    6/2019

OTHER PUBLICATIONS

Indian Patent Application No. 202347072677, Office Action dated Oct. 8, 2025, 3 pages.
PCT/CN2021/084756, International Search Report dated Dec. 31, 2021, 2 pages.

* cited by examiner

*Primary Examiner* — Willie J Daniel, Jr.
(74) *Attorney, Agent, or Firm* — Cozen O'Connor

(57)              ABSTRACT
A method for selecting a policy control function (PCF) network element is performed by a first PCF network element. The method includes: in response to a received policy association establishment request being related to a packet data unit (PDU) session of a user equipment (UE) within a UE group, determining whether to select a same PCF network element serving each UE in the UE group for the PDU session of the UE; and requesting a binding support function (BSF) network element to select a PCF network element for the PDU session of the UE based on a result of determining whether to select the same PCF network element for the PDU session of the UE.

16 Claims, 7 Drawing Sheets in response to a received policy association establishment request being related to a packet data unit (PDU) session of a user equipment (UE) within a UE group, determining whether to select a same PCF network element serving each UE in the UE group for the PDU session of the UE — S101 requesting a binding support function (BSF) network element to select a PCF network element for the PDU session of the UE based on a result of determining whether to select the same PCF network element for the PDU session of the UE — S102

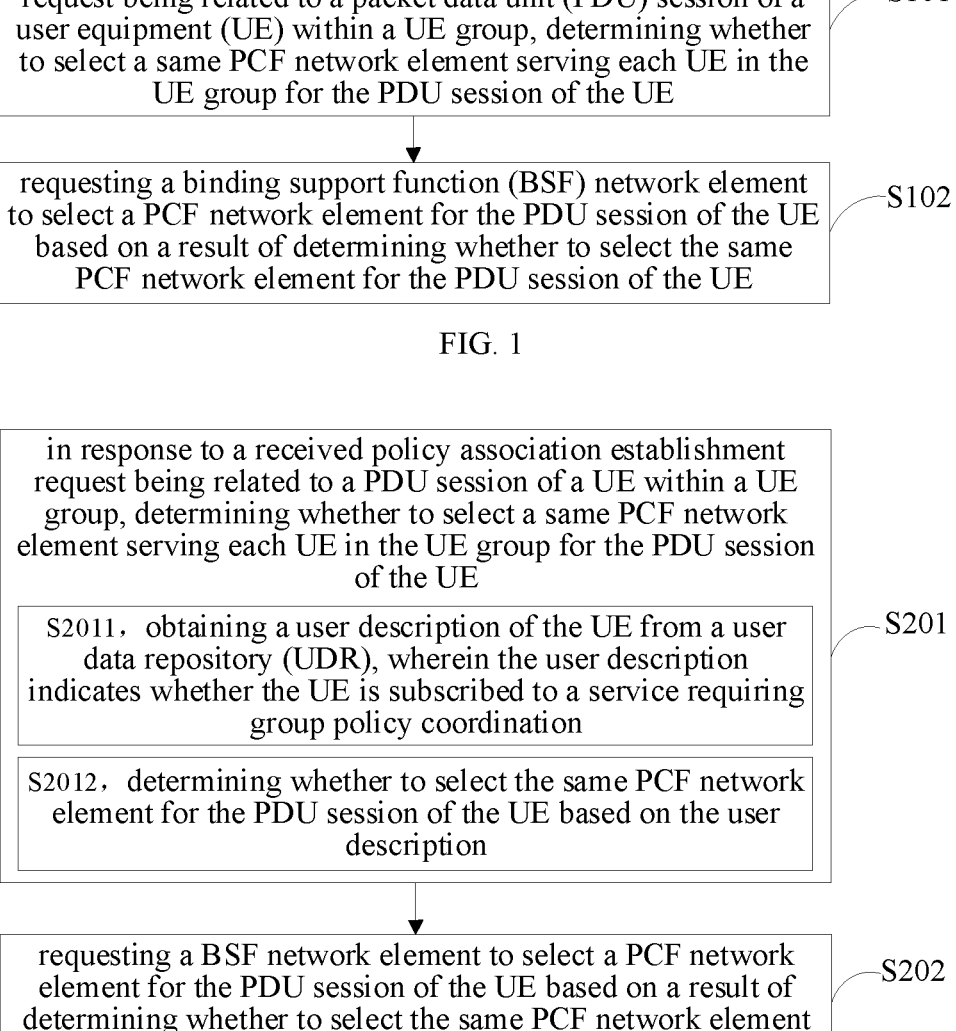

in response to a received policy association establishment request being related to a packet data unit (PDU) session of a user equipment (UE) within a UE group, determining whether to select a same PCF network element serving each UE in the UE group for the PDU session of the UE — S101 requesting a binding support function (BSF) network element to select a PCF network element for the PDU session of the UE based on a result of determining whether to select the same PCF network element for the PDU session of the UE — S102

FIG. 1 in response to a received policy association establishment request being related to a PDU session of a UE within a UE group, determining whether to select a same PCF network element serving each UE in the UE group for the PDU session of the UE S2011, obtaining a user description of the UE from a user data repository (UDR), wherein the user description indicates whether the UE is subscribed to a service requiring group policy coordination — S201

S2012, determining whether to select the same PCF network element for the PDU session of the UE based on the user description requesting a BSF network element to select a PCF network element for the PDU session of the UE based on a result of determining whether to select the same PCF network element for the PDU session of the UE — S202

FIG. 2 in response to a received policy association establishment request being related to a PDU session of a UE within a UE group, determining whether to select a same PCF network element serving each UE in the UE group for the PDU session of the UE

Figures 3, 4:
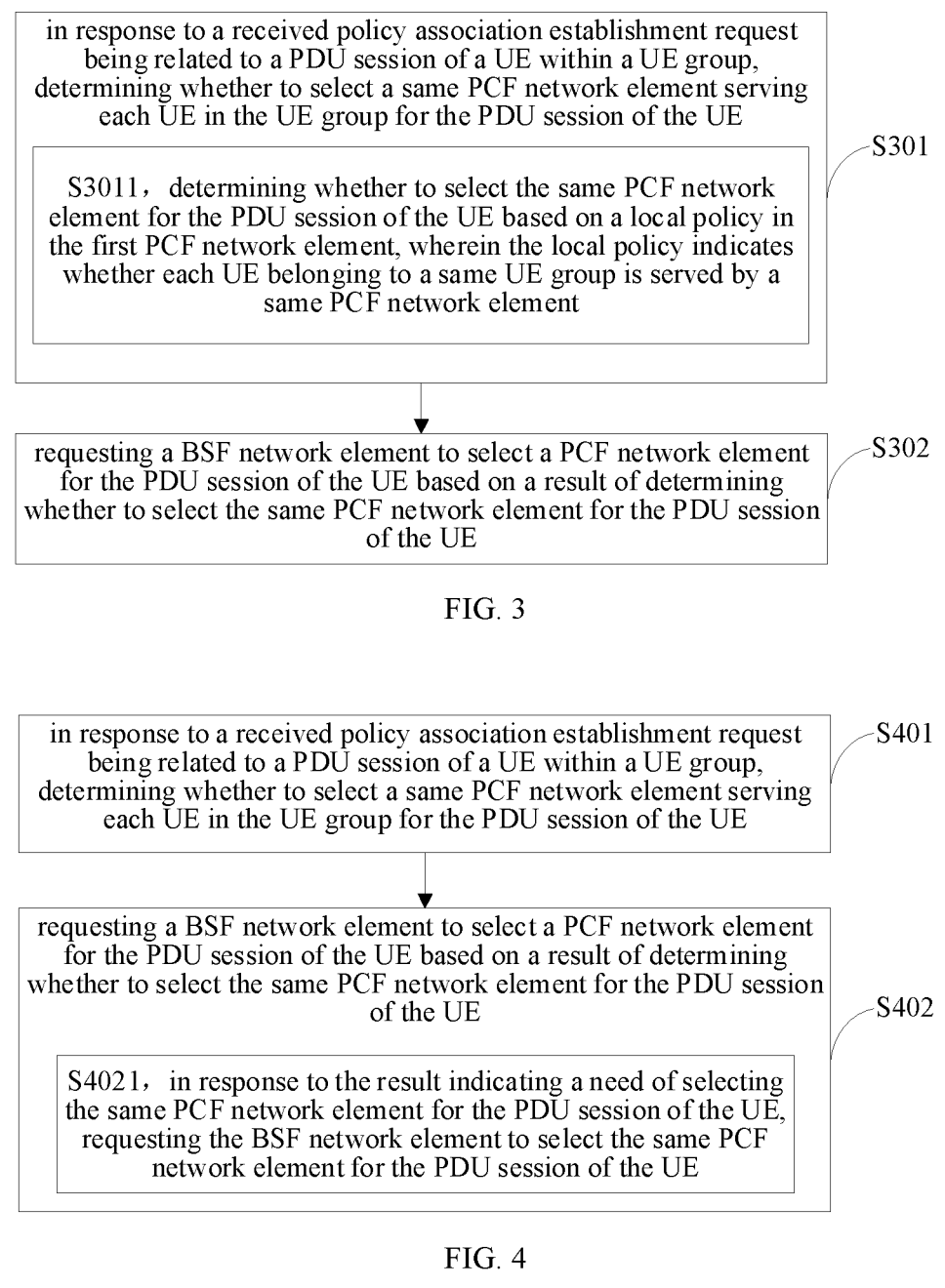

S301

S3011, determining whether to select the same PCF network element for the PDU session of the UE based on a local policy in the first PCF network element, wherein the local policy indicates whether each UE belonging to a same UE group is served by a same PCF network element requesting a BSF network element to select a PCF network element for the PDU session of the UE based on a result of determining whether to select the same PCF network element for the PDU session of the UE

S302

FIG. 3 in response to a received policy association establishment request being related to a PDU session of a UE within a UE group, determining whether to select a same PCF network element serving each UE in the UE group for the PDU session of the UE

S401 requesting a BSF network element to select a PCF network element for the PDU session of the UE based on a result of determining whether to select the same PCF network element for the PDU session of the UE

S402

S4021, in response to the result indicating a need of selecting the same PCF network element for the PDU session of the UE, requesting the BSF network element to select the same PCF network element for the PDU session of the UE

FIG. 4 in response to a received policy association establishment request being related to a PDU session of a UE within a UE group, determining whether to select a same PCF network element serving each UE in the UE group for the PDU session of the UE    S501 requesting a BSF network element to select a PCF network element for the PDU session of the UE based on a result of determining whether to select the same PCF network element for the PDU session of the UE S5021, in response to the result indicating a need of selecting the same PCF network element for the PDU session of the UE, requesting the BSF network element to select the same PCF network element for the PDU session of the UE S50211, sending a registration request associated with the PDU session of the UE to the BSF network element

Figures 5, 6:
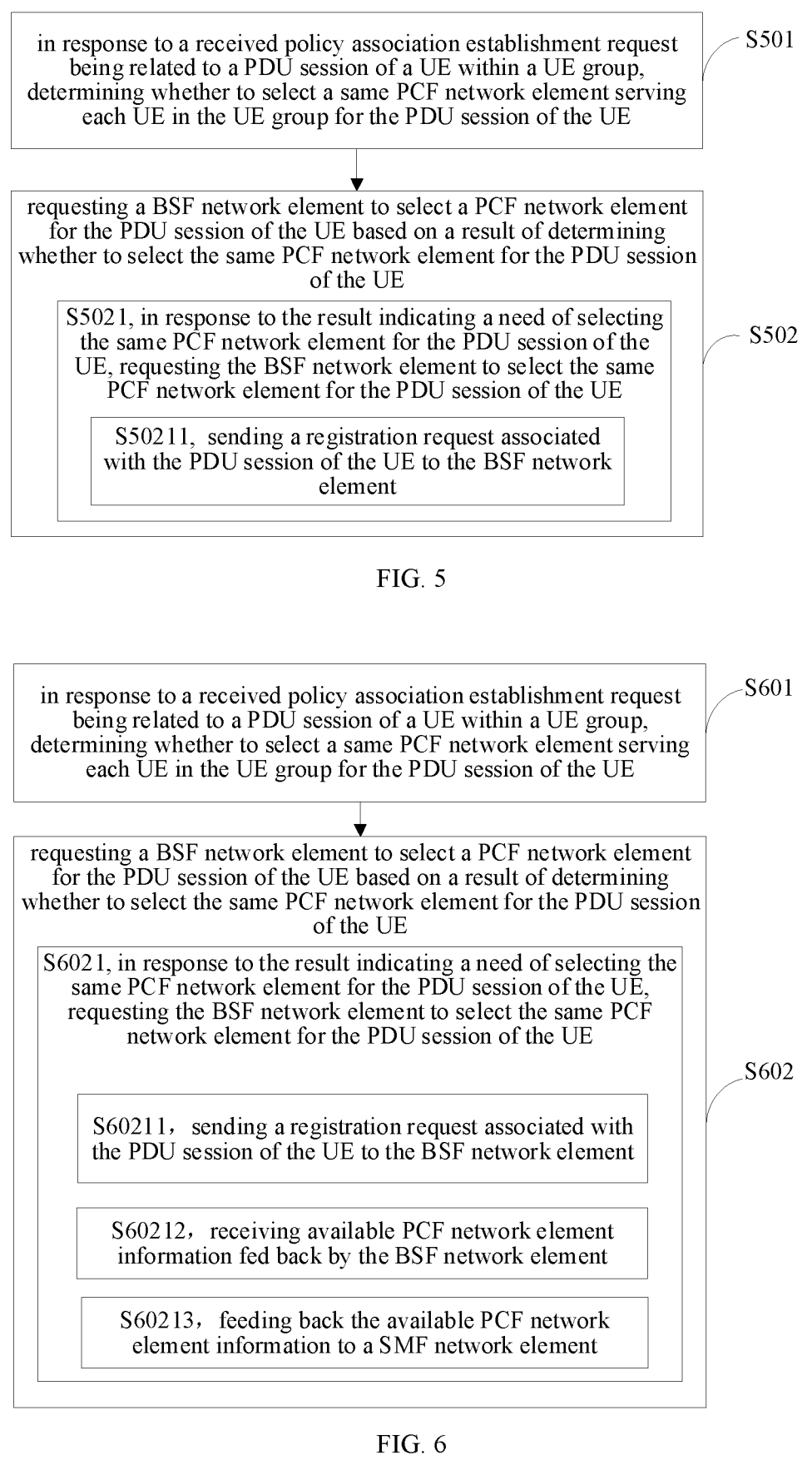

S502

FIG. 5 in response to a received policy association establishment request being related to a PDU session of a UE within a UE group, determining whether to select a same PCF network element serving each UE in the UE group for the PDU session of the UE    S601 requesting a BSF network element to select a PCF network element for the PDU session of the UE based on a result of determining whether to select the same PCF network element for the PDU session of the UE S6021, in response to the result indicating a need of selecting the same PCF network element for the PDU session of the UE, requesting the BSF network element to select the same PCF network element for the PDU session of the UE S60211, sending a registration request associated with the PDU session of the UE to the BSF network element S60212, receiving available PCF network element information fed back by the BSF network element S60213, feeding back the available PCF network element information to a SMF network element

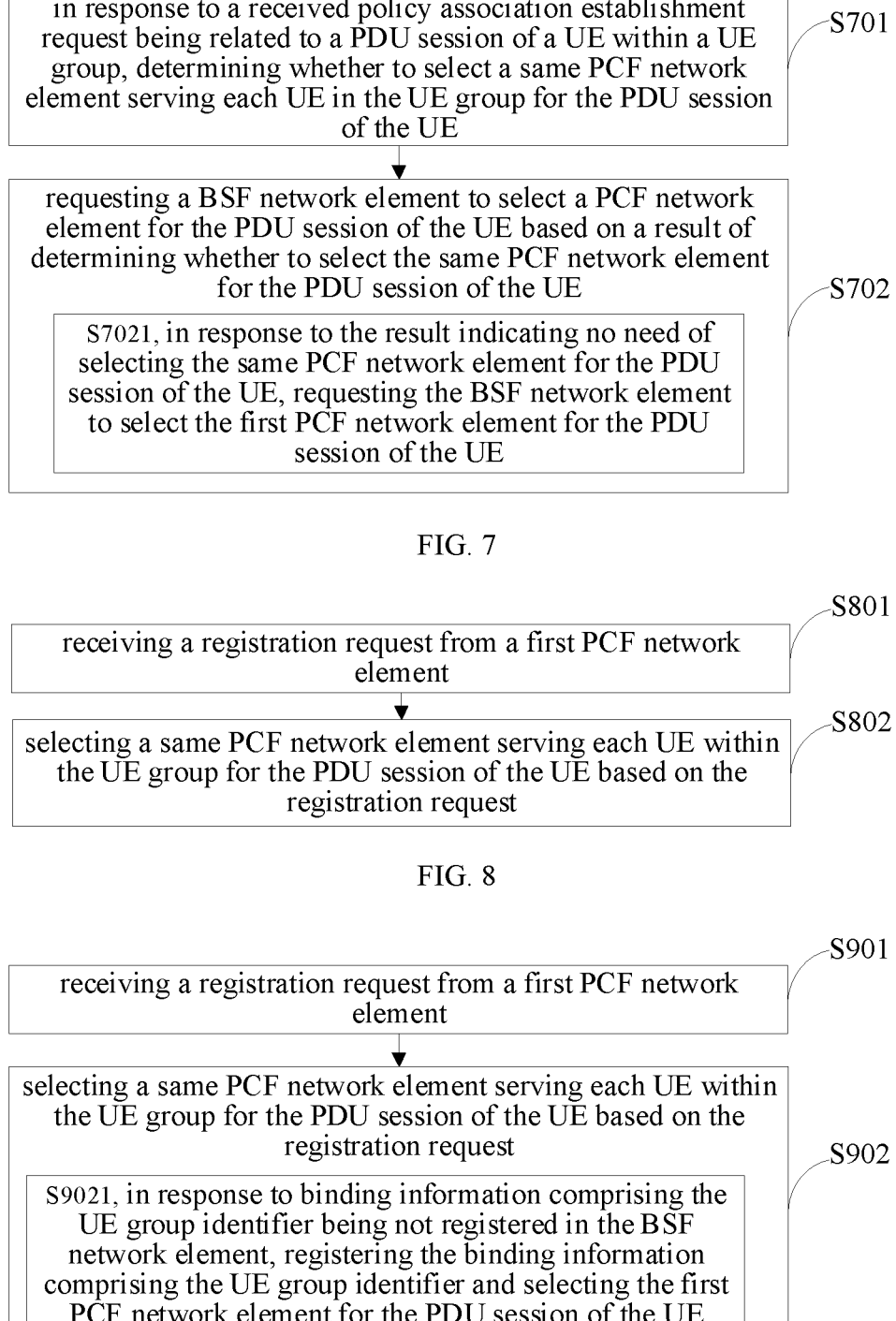

in response to a received policy association establishment request being related to a PDU session of a UE within a UE group, determining whether to select a same PCF network element serving each UE in the UE group for the PDU session of the UE ⟋S701 requesting a BSF network element to select a PCF network element for the PDU session of the UE based on a result of determining whether to select the same PCF network element for the PDU session of the UE ⟋S702

S7021, in response to the result indicating no need of selecting the same PCF network element for the PDU session of the UE, requesting the BSF network element to select the first PCF network element for the PDU session of the UE

FIG. 7 receiving a registration request from a first PCF network element ⟋S801 selecting a same PCF network element serving each UE within the UE group for the PDU session of the UE based on the registration request ⟋S802

FIG. 8 receiving a registration request from a first PCF network element ⟋S901 selecting a same PCF network element serving each UE within the UE group for the PDU session of the UE based on the registration request ⟋S902

S9021, in response to binding information comprising the UE group identifier being not registered in the BSF network element, registering the binding information comprising the UE group identifier and selecting the first PCF network element for the PDU session of the UE

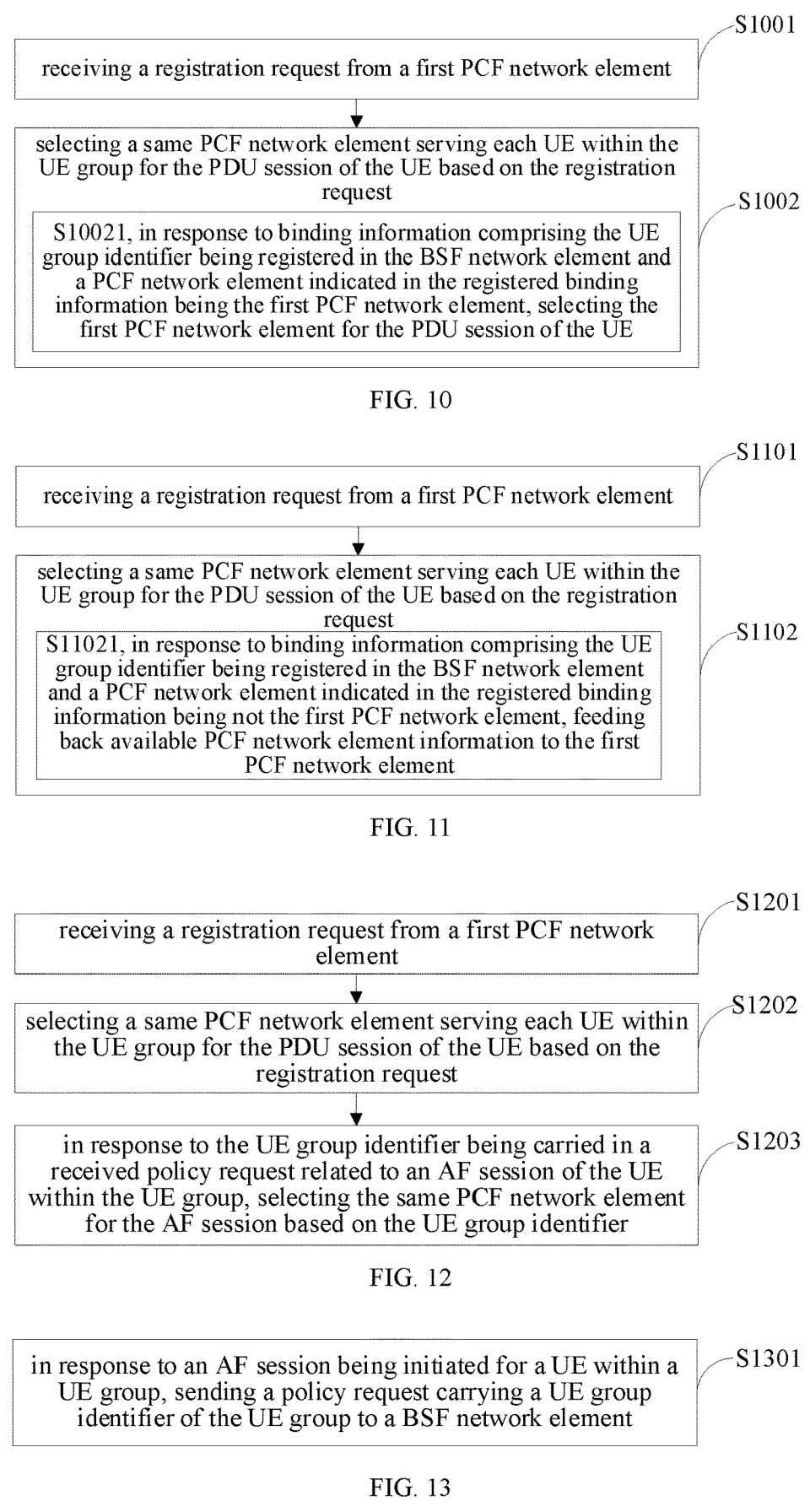

```
receiving a registration request from a first PCF network element
```

```
selecting a same PCF network element serving each UE within the
UE group for the PDU session of the UE based on the registration
request
    S10021, in response to binding information comprising the UE
    group identifier being registered in the BSF network element and
        a PCF network element indicated in the registered binding
    information being the first PCF network element, selecting the
        first PCF network element for the PDU session of the UE
```
S1002

```
receiving a registration request from a first PCF network element
```

```
selecting a same PCF network element serving each UE within the
UE group for the PDU session of the UE based on the registration
request
    S11021, in response to binding information comprising the UE
    group identifier being registered in the BSF network element
    and a PCF network element indicated in the registered binding
    information being not the first PCF network element, feeding
    back available PCF network element information to the first
        PCF network element
```
S1102

```
receiving a registration request from a first PCF network
element
```

S1202
```
selecting a same PCF network element serving each UE within
the UE group for the PDU session of the UE based on the
registration request
```

S1203
```
in response to the UE group identifier being carried in a
received policy request related to an AF session of the UE
within the UE group, selecting the same PCF network element
for the AF session based on the UE group identifier
```

FIG. 12

S1301
```
in response to an AF session being initiated for a UE within a
UE group, sending a policy request carrying a UE group
identifier of the UE group to a BSF network element
```

FIG. 13

METHODS AND DEVICES FOR POLICY CONTROL FUNCTION NETWORK ELEMENT SELECTION

CROSS-REFERENCE TO RELATED APPLICATION

This application is the U.S. national application of International Application No. PCT/CN2021/084756, filed on Mar. 31, 2021, the entire contents of which are incorporated herein by reference.

TECHNICAL FIELD

The disclosure relates to a field of mobile communication technologies, and more particularly, to a method and an apparatus for selecting a policy control function (PCF) network element.

BACKGROUND

In a current mobile network system, packet data unit (PDU) sessions of different user equipment (UE) are served by different policy control function (PCF) network elements, and the same is true even for UEs belonging to the same group of UEs, resulting in a heavy interaction process between different PCF network elements when group policy coordination is performed between different UEs.

SUMMARY

A method for selecting a policy control function (PCF) network element is provided in a first aspect of the present disclosure, which is applied to a first PCF network element. The method includes: in response to a received policy association establishment request being related to a packet data unit (PDU) session of a user equipment (UE) within a UE group, determining whether to select a same PCF network element serving each UE in the UE group for the PDU session of the UE; and requesting a binding support function (BSF) network element to select a PCF network element for the PDU session of the UE based on a result of determining whether to select the same PCF network element for the PDU session of the UE.

A method for selecting a PCF network element is provided in a second aspect of the present disclosure, which is applied to a BSF network element. The method includes: receiving a registration request from a first PCF network element, in which the registration request is related to a PDU session of a UE within a UE group and includes a UE group identifier of the UE group; and selecting a same PCF network element serving each UE in the UE group for the PDU session of the UE based on the registration request.

A method for selecting a PCF network element is provided in a third aspect of the present disclosure, which is applied to an AF network element. The method includes: in response to an AF session being initiated for a UE within a UE group, sending a policy request carrying a UE group identifier of the UE group to a BSF network element.

BRIEF DESCRIPTION OF THE DRAWINGS

The above and/or additional aspects and advantages of the present disclosure may be understood from the following description of the embodiments in conjunction with the accompanying drawings.

FIG. 1 is a flowchart of a method for selecting a PCF network element according to an embodiment of the present disclosure.

FIG. 2 is a flowchart of a method for selecting a PCF network element according to an embodiment of the present disclosure.

FIG. 3 is a flowchart of a method for selecting a PCF network element according to an embodiment of the present disclosure.

FIG. 4 is a flowchart of a method for selecting a PCF network element according to an embodiment of the present disclosure.

FIG. 5 is a flowchart of a method for selecting a PCF network element according to an embodiment of the present disclosure.

FIG. 6 is a flowchart of a method for selecting a PCF network element according to an embodiment of the present disclosure.

FIG. 7 is a flowchart of a method for selecting a PCF network element according to an embodiment of the present disclosure.

FIG. 8 is a flowchart of another method for selecting a PCF network element according to an embodiment of the present disclosure.

FIG. 9 is a flowchart of another method for selecting a PCF network element according to an embodiment of the present disclosure.

FIG. 10 is a flowchart of another method for selecting a PCF network element according to an embodiment of the present disclosure.

FIG. 11 is a flowchart of another method for selecting a PCF network element according to an embodiment of the present disclosure.

FIG. 12 is a flowchart of another method for selecting a PCF network element according to an embodiment of the present disclosure.

FIG. 13 is a flowchart of yet another method for selecting a PCF network element according to an embodiment of the present disclosure.

DETAILED DESCRIPTION

Figure 14:
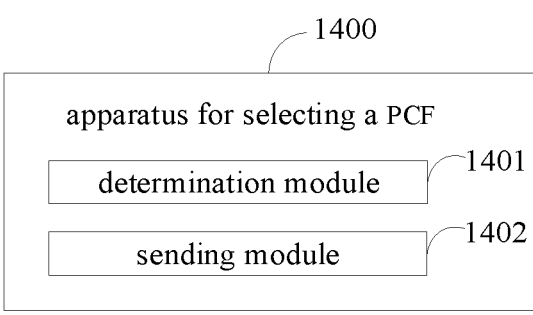
FIG. 14 is a structural diagram of an apparatus for selecting a PCF network element according to an embodiment of the present disclosure.

Embodiments of the present disclosure are described in detail below, examples of which are illustrated in accompanying drawings, throughout which the same or similar reference numerals represent the same or similar elements or elements having the same or similar functions. The embodiments described below referring to the accompanying drawings are exemplary, which are intended to explain the present disclosure and should not be construed as limiting the present disclosure.

In the current field of mobile communication technology, packet data unit (PDU) sessions of different user equipment (UE) are served by different policy control function (PCF) network elements, and the same is true even for UEs belong to the same group of UEs, resulting in a heavy interaction process between different PCF network elements.

The present disclosure provides a method and an apparatus for selecting a PCF network element. For a PDU session of a UE within a UE group, the PCF network element determines whether to select a same PCF network element serving each UE in the UE group for the PDU session of the UE and requests, based on the determination result, a BSF network element to select a PCF network element for the PDU session of the UE. Thus, the PCF network element provides a PCF network element selection method that the same PCF network element is selected for each UE in the same UE group by determining whether to select the same PCF network element for each UE in the same UE group, which avoids an interaction process between a plurality of PCF network elements serving the same UE group.

The method and apparatus for selecting a PCF network element according to the disclosure will be described in detail below with reference to the accompanying drawings.

FIG. 1 illustrates a flowchart of a method for selecting a PCF network element according to an embodiment of the present disclosure. The method is applied to a first PCF network element. As shown in FIG. 1, the method may include but is not limited to the following steps.

At S101, when a received policy association establishment request is related to a PDU session of a UE within a UE group, it is determined whether to select a same PCF network element serving each UE in the UE group for the PDU session of the UE.

In the embodiment, for a PDU session of the UE belonging to the UE group, a service management function (SMF) network element may select a PCF network element (which may be referred to as the "first PCF network element" hereafter for the sake of clarity) to serve the PDU session of the UE. For example, the SMF network element may send a policy association establishment request to the selected PCF network element. When the first PCF network element receives the policy association establishment request, it may determine whether to select for the PDU session of the UE, a same PCF network element serving each UE within the UE group. That is, the first PCF network element determines whether to select the same PCF network element to serve each UE within the UE group.

At S102, based on a result of determining whether to select the same PCF network element for the PDU session of the UE, a binding support function (BSF) network element is requested to select a PCF network element for the PDU session of the UE.

The first PCF network element may request the BSF network element to select a PCF network element for the PDU session of the UE based on the determination result of step S101.

For example, the determination result may be that there is a need to select the same PCF network element serving each UE within the UE group for the PDU session of the UE. That is, the first PCF network element determines to select the same PCF network element for each UE within the UE group.

For another example, the determination result may be that there is no need to select the same PCF network element serving each UE within the UE group for the PDU session of the UE. That is, the first PCF network element determines that there is no need to select the same PCF network element for each UE within the UE group.

The first PCF network element requests the BSF network element to select an appropriate PCF network element for the PDU session of the UE based on the determination result.

By implementing this embodiment, the PCF network element provides a PCF network element selection method that the same PCF network element is for selected for each UE in the same UE group by determining whether to select the same PCF network element for each UE within the same UE group, which may avoid the interaction process between a plurality of PCF network elements serving the same UE group.

FIG. 2 illustrates a flowchart of a method for selecting a PCF network element according to an embodiment of the present disclosure. The method is applied to the first PCF network element. Based on the embodiment described in FIG. 1, as shown in FIG. 2, the method may include but is not limited to the following steps.

At S201, when the received policy association establishment request is related to the PDU session of the UE within the UE group, it is determined whether to select the same PCF network element serving each UE in the UE group for the PDU session of the UE.

In some embodiments, the step S201 may be implemented through the following steps.

At S2011, a user description of the UE is obtained from a user data repository (UDR). The user description indicates whether the UE is subscribed to a service requiring group policy coordination.

In the mobile communication system, UDR is data warehouse that may store subscription data, policy data and other information. Based on the user description of the UE obtained from the USR, it may be learned whether the UE is subscribed to a service requiring group policy coordination. The service requiring group policy coordination indicates that the UE needs policy coordination with other UE within the same UE group to which the UE belongs. In this case, it is advantageous to select for the UE within the same group, the same PCF network element serving each UE in the UE group to provide a service.

At S2012, it is determined whether to select the same PCF network element for the PDU session of the UE based on the user description.

After obtaining the user description, it may be determined whether to select the same PCF network element for the PDU session of the UE based on whether the UE is subscribed to a service requiring group policy coordination. If the UE is subscribed to the service requiring group policy coordination, it may be determined to select the same PCF network element for the PDU session of the UE. If the UE is not subscribed to service requiring group policy coordination, it indicates that there is no need for policy coordination between the UE and other UE within the same UE group to which the UE belongs. In this case, it may be determined that there is no need to select the same PCF network element for the PDU session of the UE.

At S202, based on the result of determining whether to select the same PCF network element for the PDU session of the UE, the BSF network element is requested to select a PCF network element for the PDU session of the UE.

For the specific implementation details of the step S202, reference may be made to the related description of the step S102 in the embodiment shown in FIG. 1, which will not be repeated here.

By implementing this embodiment, the PCF network element may determine whether to select the same PCF network element serving each UE in the same UE group for the PDU session of the UE, based on the user description of the UE obtained from the UDR. The UDR stores the user description of the UE. Based on the user description, it may be directly known whether the UE is subscribed to the service requiring group policy coordination, so that the PCF network element may determine whether to select the same PCF network element for the PDU session of the UE.

FIG. 3 illustrates a flowchart of a method for selecting a PCF network element according to an embodiment of the present disclosure. The method is applied to the first PCF network element. Based on the embodiment described in FIG. 1, as shown in FIG. 3, the method may include but is not limited to the following steps.

At S301, when the received policy association establishment request is related to the PDU session of the UE within the UE group, it is determined whether to select the same PCF network element serving each UE in the UE group for the PDU session of the UE.

In some embodiments, the step S301 may be implemented through the following steps.

At S3011, it may be determined whether to select the same PCF network element for the PDU session of the UE based on a local policy in the first PCF network element. The local policy indicates whether each UE belonging to a same UE group is served by a same PCF network element.

In the mobile communication system, the PCF network element may be pre-configured with a relevant policy. The relevant policy may indicate whether to select the same PCF network element to provide services for each UE belonging to the same UE group. By configuring the relevant policy, the PCF network element may directly know whether there is a need to select a same PCF network element serving each UE within the UE group for the PDU session of the UE.

At S302, based on the result of determining whether to select the same PCF network element for the PDU session of the UE, the BSF network element is requested to select a PCF network element for the PDU session of the UE.

Regarding the specific implementation details of the step S302, reference may be made to the related description of the step S102 in the embodiment shown in FIG. 1, which will not be described again here.

By implementing this embodiment, the PCF network element may determine whether to select the same PCF network element serving each UE in the same UE group for the PDU session of the UE based on the local policy. Since the PCF network element indicates in the local policy whether each UE belonging to the same UE group is served by the same PCF network element, so the PCF network element may directly and quickly determine from the local policy whether to select the same PCF network element for the PDU session of the UE without querying the UDR.

FIG. 4 illustrates a flowchart of a method for selecting a PCF network element according to an embodiment of the present disclosure. The method is applied to the first PCF network element. Based on the embodiment described in any one of FIG. 1 to FIG. 3, as shown in FIG. 4, the method may include but is not limited to the following steps.

At S401, when the received policy association establishment request is related to the PDU session of the UE within the UE group, it is determined whether to select the same PCF network element serving each UE in the UE group for the PDU session of the UE.

Regarding the specific implementation details of the step S401, reference may be made to the related descriptions of the step S101 in the embodiment shown in FIG. 1, the step S201 in the embodiment shown in FIG. 2, and the step S301 in the embodiment shown in FIG. 3, which will not be repeated here.

At S402, based on the result of determining whether to select the same PCF network element for the PDU session of the UE, the BSF network element is requested to select a PCF network element for the PDU session of the UE.

As described above based on the related description of S101 in the embodiment of FIG. 1, the determination result may be that there is a need to select the same PCF network element serving each UE within the UE group for the PDU session of the UE, or may be that there is no need to select the same PCF network element serving each UE within the UE group for the PDU session of the UE. Based on different determination results, different registration requests may be made to the BSF network element.

For example, the step S402 may be implemented through the following steps.

At S4021, when the result indicates a need of selecting the same PCF network element for the PDU session of the UE, the BSF network element is requested to select the same PCF network element for the PDU session of the UE.

In this embodiment, for the determination result that there is a need to select the same PCF network element serving each UE within the UE group for the PDU session of the UE (that is, the first PCF network element determines to select the same PCF network element for each UE within the UE group), the first PCF network element may submit a registration request to select the same PCF network element for the PDU session of the UE to the BSF network element, so as to achieve the purpose of selecting for the PDU session of the UE, the same PCF network element serving each UE within the UE group to which the UE belongs By implementing this embodiment, when the PCF network element determines that there is a need to select the same PCF network element serving each UE in the UE group to which the UE belongs for the PDU session of the UE, the PCF network element submits a registration request to the BSF network element to select the same PCF network element for the PDU session of the UE, so as to achieve the purpose of selecting the same PCF network element for each UE within the same UE group.

FIG. 5 illustrates a flowchart of a method for selecting a PCF network element according to an embodiment of the present disclosure. The method is applied to the first PCF network element. Based on the embodiment described in FIG. 4, as shown in FIG. 5, the method may include but is not limited to the following steps:

At S501, when the received policy association establishment request is related to the PDU session of the UE within the UE group, it is determined whether to select the same PCF network element serving each UE in the UE group for the PDU session of the UE.

For the specific implementation details of the step S501, reference may be made to the related descriptions of the step S101 in the embodiment shown in FIG. 1, the step S201 in the embodiment shown in FIG. 2, and the step S301 in the embodiment shown in FIG. 3. I won't go into details here.

At S502, based on the result of determining whether to select the same PCF network element for the PDU session of the UE, the BSF network element is requested to select a PCF network element for the PDU session of the UE.

As described above based on the related description of the step S101 in the embodiment of FIG. 1, the determination result may be that there is a need to select the same PCF network element serving each UE within the UE group for the PDU session of the UE, or may be that there is no need to select the same PCF network element serving each UE within the UE group for the PDU session of the UE. Based on different determination results, different registration requests may be made to the BSF network element.

In some embodiments, the step S502 may be implemented through the following steps.

At S5021, when the result indicates a need of selecting the same PCF network element for the PDU session of the UE, the BSF network element is requested to select the same PCF network element for the PDU session of the UE.

In this embodiment, the determination result is that there is a need to select the same PCF network element serving each UE within the UE group for the PDU session of the UE (that is, the first PCF network element determines to select the same PCF network element for each UE within the UE group), the first PCF network element may submit a registration request to select the same PCF network element for the PDU session of the UE to the BSF network element through the following steps.

At S50211, a registration request associated with the PDU session of the UE is sent to the BSF network element, so that the BSF network element selects the first PCF network element for the PDU session of the UE when the BSF network element determines that the first PCF network element may serve as the same PCF network element based on the registration request. The registration request includes a UE group identifier of the UE group.

In this embodiment, when the first PCF network element determines there is a need to select for the PDU session of the UE, the same PCF network element serving each UE within the UE group to which the UE belongs, the first PCF network element sends a registration request carrying the UE group identifier of the UE group to the BSF network element, so that the BSF network element may select the same PCF network element for the PDU session of the UE based on the UE group identifier. That is, the BSF network element selects the same PCF network element for a PDU session of each UE in the UE group, based on the UE group identifier of a group of UEs.

In some embodiments, the UE group identifier may be obtained by querying the user description of the UE stored in the UDR.

The user description of the UE stored in the UDR may record a UE group identifier of a UE group to which a UE belongs, so that any network device in need may obtain a UE group identifier of a UE group to which a UE belongs by querying a user description of the UE stored in the UDR. For example, when the PCF network element determines that there is a need to select the same PCF network element serving each UE in the UE group to which the UE belongs for the PDU session of the UE, the PCF network element may obtain the UE group identifier of the UE group by querying the user description of the UE stored in the UDR, enable the UE group identifier to be carried in the registration request and send to the BSF network element, so as to request to select the same PCF network element for the PDU session of the UE.

Usually, after the BSF network element receives a registration request for a certain PDU session from a certain PCF network element, the BSF network element may give priority to selecting the PCF network element for the PDU session. However, in this embodiment, after the BSF network element receives a registration request for a PDU session of a certain UE that carries a UE group identifier from the first PCF network element, even if the registration request comes from the first PCF network element, the BSF network element will determine whether the first PCF network element may serve as the same PCF network element since the registration request carries a UE group identifier (which indicates it is expected to select for the PDU session of the UE, the same PCF network element serving each UE in the UE group to which the UE belongs). Only when the first PCF network element may serve as the same PCF network element, the BSF network element may select the first PCF network element for the PDU session of the UE.

In some embodiments, a condition for the first PCF network element that may serve as the same PCF network element includes one of: binding information including the UE group identifier is not registered in the BSF network element; or binding information including the UE group identifier is registered in the BSF network element and a PCF network element indicated in the registered binding information is the first PCF network element.

The BSF network element may determine whether the first PCF network element may serve as the same PCF network element according to a registration state of the binding information.

For example, if the binding information including the UE group identifier is not registered in the BSF network element, meaning that the BSF network element has not selected a PCF network element for a PDU session of any UE in the UE group. In this case, any PCF network element may be selected for the PDU session of the UE. Considering that the registration request is sent by the first PCF network element, the first PCF network element may serve as the same PCF network element and the first PCF network element is selected for the PDU session of the UE.

For another example, if the binding information including the UE group identifier is registered in the BSF network element, meaning that the BSF network element has selected a PCF network element for a PDU session of a UE within the UE group, it may be determined based on the registered binding information whether a PCF network element that has been selected for the PDU session of the UE within the UE group (hereinafter may be referred to as the "selected PCF network element") is the first PCF network element. Usually, the binding information may record information on the selected PCF network element. If the information on the selected PCF network element indicates that the selected PCF network element is the first PCF network element, meaning that the same PCF network element serving each UE within the UE group is the first PCF network element, the first PCF network element may be selected for the PDU session of the UE.

By implementing this embodiment, when the PCF network element determines that there is a need to select for the PDU session of the UE, the same PCF network element serving each UE in the UE group to which the UE belongs, the PCF network element sends a registration request carrying the UE group identifier of the UE group to the BSF network element, and selects the same PCF network element for the PDU session of the UE, so as to achieve the purpose of selecting the same PCF network element for each UE within the same UE group.

FIG. 6 illustrates a flowchart of a method for selecting a PCF network element according to an embodiment of the present disclosure. The method is applied to the first PCF network element. Based on the embodiment described in FIG. 5, as shown in FIG. 6, the method may include but is not limited to the following steps.

At S601, when the received policy association establishment request is related to the PDU session of the UE within the UE group, it is determined whether to select the same PCF network element serving each UE in the UE group for the PDU session of the UE.

Regarding the specific implementation details of the step S601, reference may be made to the related descriptions of the step S101 in the embodiment shown in FIG. 1, the step S201 in the embodiment shown in FIG. 2, and the step S301 in the embodiment shown in FIG. 3, which will not be repeated here.

At S602, based on the result of determining whether to select the same PCF network element for the PDU session of the UE, the BSF network element is requested to select a PCF network element for the PDU session of the UE.

As described above based on the related description of step S101 in the embodiment of FIG. 1, the determination result may be that there is a need to select the same PCF network element serving each UE within the UE group for the PDU session of the UE, or may be that there is no need to select the same PCF network element serving each UE within the UE group for the PDU session of the UE. Based on different determination results, different registration requests may be made to the BSF network element.

In some embodiments, the step S602 may be implemented through the following steps.

At S6021, when the result indicates a need of selecting the same PCF network element for the PDU session of the UE, the BSF network element is requested to select the same PCF network element for the PDU session of the UE.

In this embodiment, for the determination result that there is a need to select the same PCF network element serving each UE within the UE group for the PDU session of the UE (that is, the first PCF network element determines to select the same PCF network element for each UE within the UE group), the first PCF network element may submit a registration request to the BSF network element to select the same PCF network element for the PDU session of the UE through the following steps.

At S60211, a registration request associated with the PDU session of the UE is sent to the BSF network element, so that the BSF network element selects the first PCF network element for the PDU session of the UE when the BSF network element determines that the first PCF network element may serve as the same PCF network element based on the registration request. The registration request includes a UE group identifier of the UE group.

For the specific implementation details of the step S60211, reference may be made to the related description of the step S50211 in the embodiment shown in FIG. 5, which will not be repeated here.

At S60212, available PCF network element information fed back by the BSF network element is received. The available PCF network element information is fed back when the BSF network element determines based on the registration request that the first PCF network element cannot serve as the same PCF network element, and the available PCF network element information is related information of the same PCF network element.

As described in the above step S60211, when the first PCF network element determines that there is a need to select the same PCF network element serving each UE within the UE group to which the UE belongs for the PDU session of the UE, the registration request carrying the UE group identifier is sent to the BSF network element, and when the BSF network element determines that the first PCF network element may serve as the same PCF network element based on the UE group identifier, the first PCF network element is selected for the PDU session of the UE.

However, if the BSF network element determines that the first PCF network element cannot serve as the same PCF network element based on the UE group identifier, the BSF network element may not select the first PCF network element for the PDU session of the UE and feed available PCF network element information back to the first PCF network element. The available PCF network element information is related information of the same PCF network element.

In some embodiments, a condition for the first PCF network element that may serve as the same PCF network element includes: binding information including the UE group identifier is registered in the BSF network element and a PCF network element indicated in the registered binding information is not the first PCF network element.

The BSF network element may determine whether the first PCF network element can serve as the same PCF network element according to a registration state of the binding information.

For example, if binding information including the UE group identifier is registered in the BSF network element, meaning that the BSF network element has selected a PCF network element for a PDU session of a UE within the UE group, it may be determined based on the registered binding information whether a PCF network element that has been selected for the PDU session of the UE in the UE group (hereinafter referred to as the "selected PCF network element") is the first PCF network element. Usually, the binding information may record information on the selected PCF network element information. If the information on the selected PCF network element indicates that the selected PCF network element is not the first PCF network element, meaning that the same PCF network element serving each UE within the UE group is not the first PCF network element, the first PCF network element should not be selected for the PDU session of the UE. In this case, the same PCF network element serving each UE within the UE group is a PCF network element specified in the registered binding information. The BSF network element may feed back to the first PCF network element, available PCF network element information indicating related information of the PCF network element specified in the registered binding information.

S60213, the available PCF network element information is fed back to a SMF network element, so that the SMF network element may reselect the same PCF network element for the PDU session of the UE based on the available PCF network element information.

The first PCF network element receives the available PCF network element information from the BSF network element, meaning that the first PCF network element is not suitable to serve the PDU session of the UE. That is to say, the SMF network element fails to select a suitable PCF network element when selecting a PCF network element for the PDU session of the UE. In this case, the first PCF network element feeds back the available PCF network element information to the SMF network element, so that the SMF network element may reselect a suitable PCF network element for the PDU session of the UE based on the available PCF network element information. Since the available PCF network element information is related information of the same PCF network element, the SMF network element may select the same PCF network element for the PDU session of the UE based on the available PCF network element information, so as to achieve the purpose of selecting the same PCF network element for a PDU session of each UE within the same group of UEs.

By implementing this embodiment, when the PCF network element determines that there is a need to select the same PCF network element serving each UE in the UE group to which the UE belongs for the PDU session of the UE, the PCF network element sends a registration request carrying the UE group identifier of the UE group to the BSF network element, and selects the same PCF network element for the PDU session of the UE, so as to achieve the purpose of selecting the same PCF network element for each UE in the same UE group.

FIG. 7 illustrates a flowchart of a method for selecting a PCF network element according to an embodiment of the present disclosure. The method is applied to the first PCF network element. Based on the embodiment described in any one of FIG. 1 to FIG. 3, as shown in FIG. 7, the method may include but is not limited to the following steps.

At S701, when the received policy association establishment request is related to the PDU session of the UE within the UE group, it is determined whether to select the same PCF network element serving each UE within the UE group for the PDU session of the UE.

Regarding the specific implementation details of the step S701, reference may be made to the related descriptions of the step S101 in the embodiment shown in FIG. 1, the step S201 in the embodiment shown in FIG. 2, and the step S301 in the embodiment shown in FIG. 3, which will not be repeated here.

At S702, based on the result of determining whether to select the same PCF network element for the PDU session of the UE, the BSF network element is requested to select a PCF network element for the PDU session of the UE.

As described above based on the related description of step S101 in the embodiment of FIG. 1, the determination result may be that there is a need to select the same PCF network element serving each UE within the UE group for the PDU session of the UE, or may be that there is no need to select the same PCF network element serving each UE within the UE group for the PDU session of the UE. Based on different determination results, different registration requests may be made to the BSF network element.

In some embodiments, the step S702 may be implemented through the following steps.

At S7021, when the result indicates no need of selecting the same PCF network element for the PDU session of the UE, the BSF network element is requested to select the first PCF network element for the PDU session of the UE.

In this embodiment, for the determination result that there is no need to select the same PCF network element serving each UE within the UE group for the PDU session of the UE (that is, the first PCF network element determines that there is no need to select the same PCF network element for each UE within the UE group), the first PCF network element may submit a registration request to select the first PCF network element for the PDU session of the UE to the BSF network element. For example, a registration request that does not carry the UE group identifier of the UE group is sent to the BSF network element. After the BSF network element receives the registration request from the first PCF network element, since the registration request does not carry the UE group identifier, the BSF network element may select the first PCF network element for the PDU session of the UE.

By implementing this embodiment, when the PCF network element determines that there is no need to select the same PCF network element serving each UE in the UE group to which the UE belongs for the PDU session of the UE, the PCF network element submits a registration request to select a PCF network element for the PDU session of the UE to the BSF network element, so that the BSF network element may select a PCF network element for the PDU session of the UE.

FIG. 8 illustrates a flowchart of another method for selecting a PCF network element according to an embodiment of the present disclosure. The method is applied to a BSF network element. As shown in FIG. 8, the method may include but is not limited to the following steps.

At S801, a registration request is received from the first PCF network element. The registration request is related to a PDU session of a UE within a UE group and includes a UE group identifier of the UE group.

In this embodiment, for the PDU session of the UE belonging to the UE group, a SMF network element may select a PCF network element (which may be referred to as the "first PCF network element" hereafter for the sake of clarity) to serve the PDU session of the UE. For example, the SMF network element may send a policy association establishment request to the selected PCF network element. When the first PCF network element receives the policy association establishment request, the first PCF network element may send a registration request carrying the UE group identifier of the UE group to the BSF network element, so as to request a selection of the same PCF network element serving each UE within the UE group for the PDU session of the UE group.

At S802, a same PCF network element serving each UE within the UE group is selected for the PDU session of the UE based on the registration request.

After receiving the registration request carrying the UE group identifier, the BSF network element selects the same PCF network element serving each UE within the UE group for the PDU session of the UE based on the UE group identifier.

By implementing this embodiment, after receiving a registration request carrying the UE group identifier of the UE group from the PCF network element selected for the PDU session of the UE within the UE group, the BSF network element selects the same PCF network element serving each UE within the UE group for the PDU session of the UE, so as to achieve the purpose of selecting the same PCF network element for each UE within the same UE group.

FIG. 9 illustrates a flowchart of another method for selecting a PCF network element according to an embodiment of the present disclosure. The method is applied to the BSF network element. Based on the embodiment shown in FIG. 8, as shown in FIG. 9, the method may include but is not limited to the following steps.

At S901, a registration request is received from the first PCF network element. The registration request is related to a PDU session of a UE within a UE group and includes a UE group identifier of the UE group.

For the specific implementation details of the step S901, reference may be made to the related description of the step S801 in the embodiment shown in FIG. 8, which will not be repeated here.

At S902, a same PCF network element serving each UE within the UE group is selected for the PDU session of the UE based on the registration request.

After receiving the registration request carrying the UE group identifier, the BSF network element selects the same PCF network element serving each UE within the UE group for the PDU session based on the UE group identifier.

In some embodiments, the step S902 may be implemented through the following steps.

At S9021, when binding information including the UE group identifier is not registered in the BSF network element, the binding information including the UE group identifier is registered and the first PCF network element is selected for the PDU session of the UE.

Usually, after the BSF network element receives a registration request for a certain PDU session from a certain PCF network element, the BSF network element may select a PCF network element for the PDU session. However, in the disclosure, after the BSF network element receives the registration request for the PDU session of the certain UE carrying the UE group identifier from the first PCF network element, even if the registration request comes from the first PCF network element, the BSF network element will determine whether the first PCF network element may serve as the same PCF network element since the registration request carries a UE group identifier (which indicates it is expected to select for the PDU session of the UE, the same PCF network element serving each UE in the UE group to which the UE belongs). Only when the first PCF network element may serve as the same PCF network element, the BSF network element may select the first PCF network element for the PDU session of the UE.

The BSF network element may determine whether the first PCF network element may serve as the same PCF network element according to a registration state of the binding information.

For example, if the binding information including the UE group identifier is not registered in the BSF network element, meaning that the BSF network element has not selected a PCF network element for a PDU session of any UE in the UE group. In this case, any PCF network element may be selected for the PDU session of the UE. Considering that the registration request is sent by the first PCF network element, the first PCF network element may serve as the same PCF network element and the first PCF network element is selected for the PDU session of the UE.

By implementing this embodiment, after the BSF network element receives a registration request carrying the UE group identifier of the UE group from the PCF network element selected for the PDU session of the UE within the UE group, if binding information including the UE group identifier is not registered in the BSF network element, the PCF network element is selected for the PDU session of the UE.

FIG. 10 illustrates a flowchart of another method for selecting a PCF network element according to an embodiment of the present disclosure. This method is applied to the BSF network element. Based on the embodiment shown in FIG. 8, as shown in FIG. 10, the method may include but is not limited to the following steps.

At S1001, a registration request is received from the first PCF network element. The registration request is related to a PDU session of a UE within a UE group and includes a UE group identifier of the UE group.

Regarding the specific implementation details of the step S1001, reference may be made to the related description of the step S801 in the embodiment shown in FIG. 8, which will not be repeated here.

At S1002, a same PCF network element serving each UE within the UE group is selected for the PDU session of the UE based on the registration request.

After receiving the registration request carrying the UE group identifier, the BSF network element selects the same PCF network element serving each UE within the UE group for the PDU session of the UE based on the UE group identifier.

In some embodiments, the step S1002 can be implemented by the following steps.

At S10021, when the binding information including the UE group identifier is registered in the BSF network element and a PCF network element indicated in the registered binding information is the first PCF network element, the first PCF network element is selected for the PDU session of the UE.

In the disclosure, after the BSF network element receives a registration request carrying the UE group identifier for a PDU session of a certain UE from the first PCF network element, even if the registration request comes from the first PCF network element, the BSF network element will determine whether the first PCF network element may serve as the same PCF network element since the registration request carries a UE group identifier (which indicates it is expected to select for the PDU session of the UE, the same PCF network element serving each UE in the UE group to which the UE belongs). Only when the first PCF network element may serve as the same PCF network element, the BSF network element may select the first PCF network element for the PDU session of the UE.

The BSF network element may determine whether the first PCF network element may serve as the same PCF network element according to a registration state of the binding information.

For example, if the binding information including the UE group identifier is registered in the BSF network element, meaning that the BSF network element has selected a PCF network element for a PDU session of a UE in the UE group, it may be determined based on the registered binding information whether the PCF network element that has been selected for the PDU session of the UE within the UE group (hereinafter referred to as the "selected PCF network element") is the first PCF network element. Usually, the binding information may record information on the selected PCF network element. If the information on the selected PCF network element indicates that the selected PCF network element is the first PCF network element, meaning that the same PCF network element serving each UE within the UE group is the first PCF network element, the first PCF network element may be selected for the PDU session of the UE.

By implementing this embodiment, after the BSF network element receives a registration request carrying the UE group identifier of the UE group from the PCF network element selected for the PDU session of the UE within the UE group, if the binding information including the UE group identifier is already registered in the BSF network element and a PCF network element specified in the registered binding information is the selected PCF network element, then the PCF network element is selected for the PDU session of the UE.

FIG. 11 illustrates a flowchart of another method for selecting a PCF network element according to an embodiment of the present disclosure. The method is applied to the BSF network element. Based on the embodiment shown in FIG. 8, as shown in FIG. 11, the method may include but is not limited to the following steps:

At S1101, a registration request is received from the first PCF network element. The registration request is related to a PDU session of a UE within a UE group and includes a UE group identifier of the UE group.

Regarding the specific implementation details of above step S1101, reference may be made to the related description of the step S801 in the embodiment shown in FIG. 8, which will not be repeated here.

At S1102, a same PCF network element serving each UE within the UE group is selected for the PDU session of the UE based on the registration request.

After receiving the registration request carrying the UE group identifier, the BSF network element selects the same PCF network element serving each UE within the UE group for the PDU session based on the UE group identifier.

In some embodiments, the step S1102 can be implemented by the following steps.

At S11021, when the binding information including the UE group identifier is registered in the BSF network element and a PCF network element indicated in the registered binding information is not the first PCF network element, available PCF network element information is fed back to the first PCF network element, so that the first PCF network element feeds back the available PCF network element information to the SMF network element and the SMF network element may reselect a same PCF network element for the PDU session of the UE. The available PCF network element information is related information of the PCF network element indicated in the registered binding.

In the disclosure, after the BSF network element receives a registration request carrying the UE group identifier for a PDU session of a certain UE from the first PCF network element, even if the registration request comes from the first PCF network element, the BSF network element will determine whether the first PCF network element may serve as the same PCF network element since the registration request carries a UE group identifier (which indicates it is expected to select for the PDU session of the UE, the same PCF network element serving each UE within the UE group to which the UE belongs). Only when the first PCF network element may serve as the same PCF network element, the BSF network element may select the first PCF network element for the PDU session of the UE.

However, if the BSF network element determines that the first PCF network element cannot serve as the same PCF network element based on the UE group identifier, the BSF network element may not select the first PCF network element for the PDU session of the UE.

The BSF network element may determine whether the first PCF network element may serve as the same PCF network element according to a registration state of the binding information.

For example, if the binding information including the UE group identifier is registered in the BSF network element, meaning that the BSF network element has selected a PCF network element for a PDU session of a UE within the UE group, it may be determined based on the registered binding information whether a PCF network element that has been selected for the PDU session of the UE within the UE group (hereinafter referred to as the "selected PCF network element") is the first PCF network element. Usually, the binding information may record information on the selected PCF network element. If the information on the selected PCF network element indicates that the selected PCF network element is not the first PCF network element, meaning that the same PCF network element serving each UE within the UE group is not the first PCF network element, the first PCF network element should not be selected for the PDU session of the UE. In this case, the same PCF network element serving each UE within the UE group is the PCF network element specified in the registered binding information. The BSF network element may feed back to the first PCF network element, available PCF network element information indicating related information of the PCF network element indicated in the registered binding information.

The first PCF network element receives the available PCF network element information from the BSF network element, meaning that the first PCF network element is not suitable to serve he PDU session of the UE. That is to say, the SMF network element fails to select a suitable PCF network element when selecting a PCF network element for the PDU session of the UE. In this case, the first PCF network element feeds back the available PCF network element information to the SMF network element, so that the SMF network element may reselect a suitable PCF network element for the PDU session of the UE based on the available PCF network element information. Since the available PCF network element information is related information of the same PCF network element, the SMF network element may select the same PCF network element for the PDU session of the UE based on the available PCF network element information, so as to achieve the purpose of selecting the same PCF network element for a PDU session of each UE within the same group of UEs.

By implementing this embodiment, after the BSF network element receives a registration request carrying the UE group identifier of the UE group from the PCF network element selected for the PDU session of the UE within the UE group, if the binding information including the UE group identifier is already registered in the BSF network element and the selected PCF network element specified in the registered binding information is not the PCF network element, then the available PCF network element information is fed back to the PCF network element for the purpose of reselecting a PCF network element.

FIG. 12 illustrates a flowchart of another method for selecting a PCF network element according to an embodiment of the present disclosure. The method is applied to the BSF network element. Based on the embodiment shown in any one of FIG. 8 to FIG. 11, as shown in FIG. 12, the method may include but is not limited to the following steps.

At S1201, a registration request is received from the first PCF network element. The registration request is related to a PDU session of a UE within a UE group and includes a UE group identifier of the UE group.

Regarding the specific implementation details of the step S1201, reference may be made to the related description of the step S801 in the embodiment shown in FIG. 8, which will not be repeated here.

At S1202, a same PCF network element serving each UE within the UE group is selected for the PDU session of the UE based on the registration request.

After receiving the registration request carrying the UE group identifier, the BSF network element selects the same PCF network element serving each UE within the UE group for the PDU session of the UE based on the UE group identifier.

For the specific implementation details of the step S1202, reference may be made to the step S802 in the embodiment shown in FIG. 8, the step S902 in the embodiment shown in FIG. 9, the step S1002 in the embodiment shown in FIG. 10 and the step S1102 in the embodiment shown in FIG. 11, which will not be repeated here.

At S1203, when the UE group identifier is carried in a received policy request related to an AF session of the UE within the UE group, the same PCF network element is selected for the AF session based on the UE group identifier.

In this embodiment, for the AF session of a UE belonging to the UE group, the AF network element may send a policy request to the BSF network element to select an appropriate PCF network element to serve the AF session. If the policy request received by the BSF network element carries the UE group identifier of the UE group, meaning that it is expected to select the same PCF network element serving each UE within the UE group for this AF session, the BSF network element may thus select the same PCF network element for the AF session.

By implementing this embodiment, after receiving the policy request carrying the UE group identifier of the UE group from the AF network element, the BSF network element selects the same PCF network element serving each UE within the UE group for the AF session of the UE, so as to achieve the purpose of selecting the same PCF network element for each UE in the same UE group.

FIG. 13 illustrates a flowchart of another method for selecting a PCF network element according to an embodiment of the present disclosure. The method is applied to an AF network element. As shown in FIG. 13, the method may include but is not limited to the following steps.

At S1301, when an AF session is initiated for a UE within a UE group, a policy request carrying a UE group identifier of the UE group is sent to a BSF network element, so that the BSF network element selects a same PCF network element serving each UE within the UE group for the AF session of the UE based on the UE group identifier.

In this embodiment, for an AF session of a UE belonging to the UE group, the AF network element may send a policy request carrying a UE group identifier of the UE group to the BSF network element, so as to select a same PCF network element serving each UE within the UE group for the AF session. If the policy request received by the BSF network element carries the UE group identifier of the UE group, meaning that it is expected to select the same PCF network element serving each UE in the UE group for the AF session, the BSF network element may thus select the same PCF network element for the AF session.

In some embodiments, the UE group identifier is stored in a user description of the UE in the UDR.

The user description of the UE stored in the UDR may record a UE group identifier of a UE group to which the UE belongs, so that any network device in need may obtain a UE group identifier of a UE group to which a UE belongs by querying a user description of the UE stored in the UDR. For example, when the AF network element determines that there is a need to select the same PCF network element serving each UE in the UE group to which the UE belongs for the AF session of the UE, the AF network element may obtain the UE group identifier of the UE group by querying the user description of the UE stored in the UDR, enable the UE group identifier to be carried in the policy request and send to the BSF network element, so as to request to select the same PCF network element for the AF session of the UE.

In some embodiments, the user description also indicates whether the UE is subscribed to a service requiring group policy coordination.

By implementing this embodiment, for an AF session of a UE belonging to a UE group, the AF network element sends a policy request carrying a UE group identifier of the UE group to the BSF network element, so that the BSF network element selects for the AF session of the UE, the same PCF network element serving each UE within the UE group, so as to achieve the purpose of selecting the same PCF network element for each UE within the same UE group.

In the above-mentioned embodiments according to the disclosure, the methods according to the embodiments of the disclosure are introduced from the perspectives of different network devices. In order to implement each function in the methods according to the above embodiments of the disclosure, the network device may include a hardware structure and a software module to implement the above functions in the form of a hardware structure, a software module, or a hardware structure plus a software module. One of the above functions may be implemented in the form of a hardware structure, a software module, or a hardware structure plus a software module Corresponding to the method for selecting a PCF network element according to the above several embodiments, the present disclosure also provides an apparatus for selecting a PCF network element. As the apparatus for selecting a PCF network element according to the embodiments of the present disclosure corresponds to the method for selecting a PCF network element according to the above several embodiments, specific implementations of the method for selecting a PCF network element are also applicable to the apparatus for selecting a PCF network element according to the embodiments, which will not be repeated in detail in this embodiment. FIG. 14 to FIG. 17 are structural diagrams of the apparatus for selecting a PCF network element according to the present disclosure.

FIG. 14 is a structural diagram of an apparatus 1400 for selecting a PCF network element according to an embodiment of the present disclosure. The apparatus is applied to the first PCF network element.

As shown in FIG. 14, the apparatus 1400 for selecting a PCF network element includes: a determination module 1401, and a sending module 1402.

The determination module 1401 is configured to in response to a received policy association establishment request being related to a PDU session of a UE within a UE group, determine whether to select a same PCF network element serving each UE in the UE group for the PDU session of the UE.

The sending module 1402 is configured to request a BSF network element to select a PCF network element for the PDU session of the UE based on a result of determining whether to select the same PCF network element for the PDU session of the UE.

By implementing this embodiment, the PCF network element provides a PCF network element selection method that the same PCF network element is selected for each UE within the same UE group by determining whether to select the same PCF network element for each UE in the same UE group, which avoids an interaction process between a plurality of PCF network elements serving the same UE group.

In some embodiments, the determination module 1401 is configured to: obtain a user description of the UE from a UDR, in which the user description indicates whether the UE is subscribed to a service requiring group policy coordination; and determine whether to select the same PCF network element for the PDU session of the UE based on the user description.

In some embodiments, the determination module 1401 is configured to: determine whether to select the same PCF network element for the PDU session of the UE based on a local policy in the first PCF network element, in which the local policy indicates whether each UE belonging to a same UE group is served by a same PCF network element.

In some embodiments, the sending module 1402 is configured to: in response to the result indicating a need of selecting the same PCF network element for the PDU session of the UE, request the BSF network element to select the same PCF network element for the PDU session of the UE.

In some embodiments, the sending module 1402 requests the BSF network element to select the same PCF network element for the PDU session of the UE by: sending a registration request associated with the PDU session of the UE to the BSF network element, so that the BSF network element determines based on the registration request that the first PCF network element may serve as the same PCF network element and selects the first PCF network element for the PDU session of the UE, in which the registration request includes a UE group identifier of the UE group.

In some embodiments, a condition for the first PCF network element to serve as the same PCF network element includes one of: binding information including the UE group identifier is not registered in the BSF network element; or binding information including the UE group identifier is registered in the BSF network element and a PCF network element indicated in the registered binding information is the first PCF network element.

Figure 15:
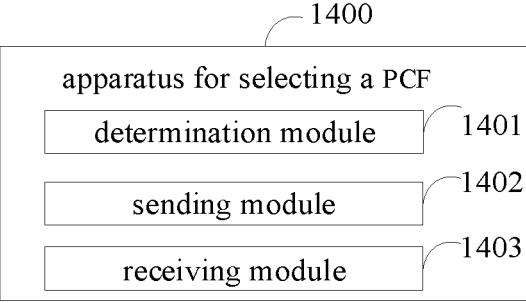
FIG. 15 is a structural diagram of an apparatus for selecting a PCF network element according to an embodiment of the present disclosure.

In some embodiments, as shown in FIG. 15, the apparatus 1400 further includes a receiving module 1403, configured to receive available PCF network element information fed back by the BSF network element, in which the available PCF network element information is fed back when the BSF network element determines based on the registration request that the first PCF network element cannot serve as the same PCF network, and the available PCF network element information is related information of the same PCF network element.

The sending module 1402 is further configured to: feed the available PCF network element information back to a SMF network element, so that the SMF network element reselects the same PCF network element for the PDU session of the UE based on the available PCF network element information.

In some embodiments, a condition that the first PCF network element cannot serve as the same PCF network element includes: binding information including the UE group identifier is registered in the BSF network element and a PCF network element indicated in the registered binding information is not the first PCF network element. The same PCF network element is the PCF network element indicated in the registered binding information.

In some embodiments, the UE group identifier is obtained by querying a user description of the UE stored in the UDR.

In some embodiments, the sending module 1402 is configured to: in response to the result indicating no need of selecting the same PCF network element for the PDU session of the UE, request the BSF network element to select the first PCF network element for the PDU session of the UE.

Figure 16:
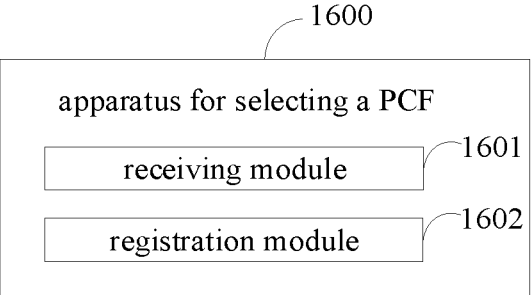
FIG. 16 is a structural diagram of another apparatus for selecting a PCF network element according to an embodiment of the present disclosure.

FIG. 16 is a structural diagram of another apparatus 1600 for selecting a PCF network element according to an embodiment of the present disclosure. The apparatus is applied to the BSF network element.

As shown in FIG. 16, the apparatus 1600 for selecting a PCF network element includes: a receiving module 1601, and a registration module 1602.

The receiving module 1601 is configured to receive a registration request from a first PCF network element, in which the registration request is related to a PDU session of a UE within a UE group and includes a UE group identifier of the UE group.

The registration module 1602 is configured to select a PCF network element for the PDU session of the UE based on the registration request.

By implementing this embodiment, after receiving a registration request carrying the UE group identifier of the UE group from the PCF network element selected for the PDU session of the UE within the UE group, the BSF network element selects he same PCF network element serving each UE within the UE group for the PDU session of the UE, so as to achieve the purpose of selecting the same PCF network element for each UE within the same UE group.

In some embodiments, the registration module 1602 is configured to: in response to binding information including the UE group identifier being not registered in the BSF network element, register the binding information including the UE group identifier and select the first PCF network element for the PDU session of the UE.

In some embodiments, the registration module 1602 is configured to: in response to binding information including the UE group identifier being registered in the BSF network element and a PCF network element indicated in the registered binding information being the first PCF network element, select the first PCF network element for the PDU session of the UE.

In some embodiments, the registration module 1602 is configured to: in response to the binding information including the UE group identifier being registered in the BSF network element and a PCF network element indicated in the registered binding information is not the first PCF network element, feed back available PCF network element information to the first PCF network element, so that the first PCF network element may feed back the available PCF network element information to the SMF network element and the SMF network element may reselect the same PCF network element for the PDU session of the UE, in which the available PCF network element information is related information of the PCF network element indicated in the registered binding information.

In some embodiments, the registration module 1602 is configured to: in response to the UE group identifier being carried in a received policy request related to an AF session of the UE within the UE group, select the same PCF network element for the AF session based on the UE group identifier.

Figure 17:
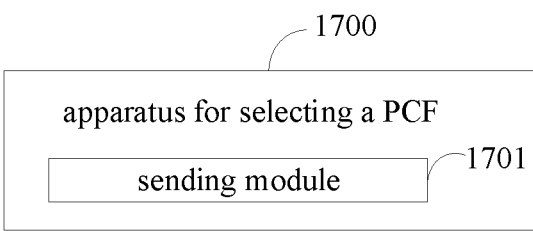
FIG. 17 is a structural diagram of yet another apparatus for selecting a PCF network element according to an embodiment of the present disclosure.

FIG. 17 is a structural diagram of another apparatus 1700 for selecting a PCF network element according to an embodiment of the present disclosure. The apparatus is applied to the AF network element.

As shown in FIG. 17, the apparatus 1700 for selecting a PCF network element includes: a sending module 1701.

The sending module 1701 is configured to in response to an AF session being initiated for a UE within a UE group, send a policy request carrying a UE group identifier of the UE group to a BSF network element, so that the BSF network element selects a PCF network element based on the policy request for the AF session of the UE.

By implementing this embodiment, for the AF session of the UE belonging to the UE group, the AF network element sends a policy request carrying the UE group identifier of the UE group to the BSF network element, so that the BSF network element selects the same PCF network element serving each UE within the UE group for the AF session of the UE, so as to achieve the purpose of selecting the same PCF network element for each UE within the same UE group.

In some embodiments, the UE group identifier is stored in a user description of the UE in a UDR.

In some embodiments, the user description also indicates whether the UE is subscribed to a service requiring group policy coordination.

Figure 18:
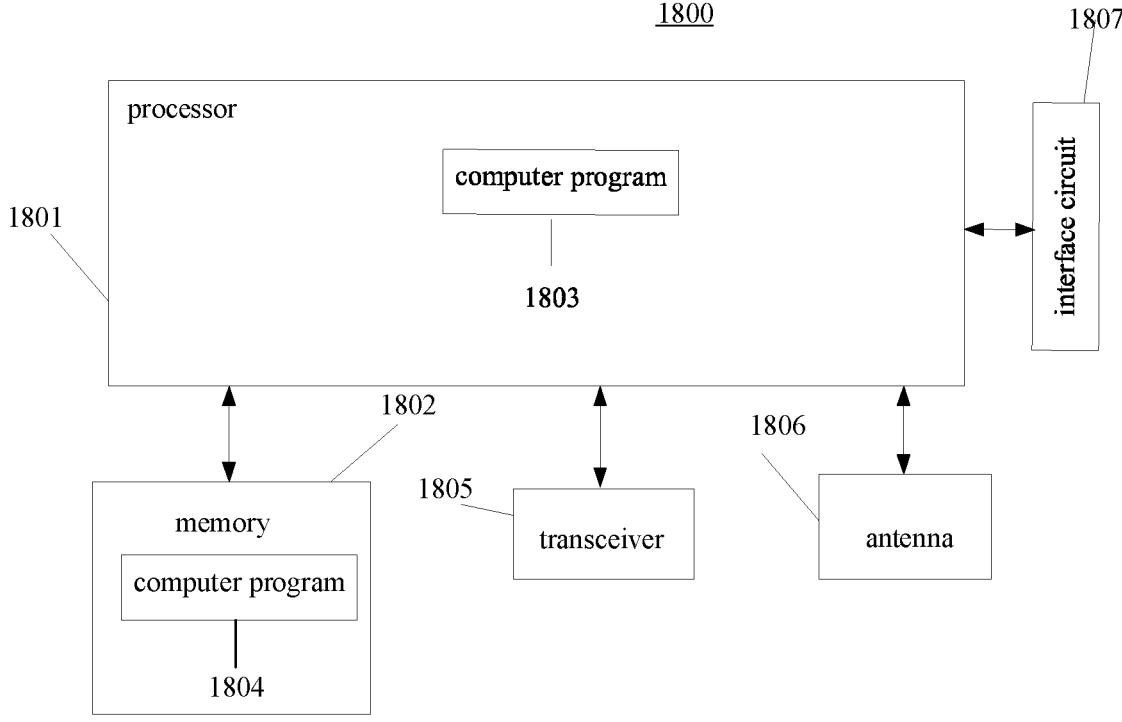
FIG. 18 is a structural diagram of a communication device according to an embodiment of the present disclosure.

Referring to FIG. 18, it is a structural diagram of another communication device 1800 according to an embodiment of the disclosure. The communication device 1800 may be a network device, or a user device, or a chip, a chip system or a processor that supports a network device to implement the above method, or a chip, a chip system or a processor that supports a terminal to implement the above method. The device can be used to implement the method described in the above method embodiments. For details, please refer to the description in the above method embodiments.

The communication device 1800 may include one or more processors 1801. The processor 1801 may be a general purpose processor or a special purpose processor or the like. For example, it may be a baseband processor or a central processing unit. The baseband processor may be used to process communication protocols and communication data. The central processor can be used to control a communication device (such as a base station, a baseband chip, a terminal, a terminal chip, a DU or a CU, etc.), execute computer programs and process data for computer programs.

Optionally, the communication device 1800 may further include one or more memories 1802, on which a computer program 1804 may be stored. The processor 1801 executes the computer program 1804, so that the communication device 1800 executes the method described in the foregoing method embodiments. Optionally, the memory 1802 may also store data. The communication device 1800 and the memory 1802 can be provided separately or integrated together.

Optionally, the communication device 1800 may also include a transceiver 1805 and an antenna 1806. The transceiver 1805 may be called a transceiver unit, a transceiver, a transceiver circuit, etc., which is used to implement transmission and reception functions. The transceiver 1805 may include a receiver and a transmitter, and the receiver may be called a receiver or a receiving circuit for realizing a reception function; the transmitter may be called a transmitter or a transmission circuit for realizing a transmission function.

Optionally, the communication device 1800 may further include one or more interface circuits 1807. The interface circuit 1807 is used to receive code instructions and transmit them to the processor 1801. The processor 1801 runs the code instructions to enable the communication device 1800 to execute the methods described in the foregoing method embodiments.

When the communication device 1800 is a network device, such as a PCF network element, the processor 1801 is used to execute the step S101 in FIG. 1, the step S2012 in FIG. 2, the step S3011 in FIG. 3, the step S401 in FIG. 4, the step S501 in FIG. 5, the step S601 in FIG. 6, the step S701 in FIG. 7. The transceiver 1805 is used to perform the step S102 in FIG. 1, the steps S2011 and S202 in FIG. 2, the step S302 in FIG. 3, the step S4021 in FIG. 4, the step S50211 in FIG. 5, the steps S60211-S60213 in FIG. 6, and the step S7021 in FIG. 7.

When the communication device 1800 is a network device, such as a BSF network element, the processor 1801 is used to execute the step S802 in FIG. 8, the step S9021 in FIG. 9, the step S10021 in FIG. 10, the step S11021 in FIG. 11, and the steps S1202-S1203 in FIG. 12. The transceiver 1805 is used to execute the step S801 in FIG. 8, the step S901 in FIG. 9, the step S1001 in FIG. 10, the step S1101 in FIG. 11, and the step S1201 in FIG. 12.

When the communication device 1800 is a network device, such as an AF network element, the transceiver 1805 is used to execute the step S1301 in FIG. 13.

In an implementation, the processor 1801 may include a transceiver for implementing receiving and sending functions. For example, the transceiver may be a transceiver circuit, an interface, or an interface circuit. The transceiver circuits, interfaces or interface circuits used to implement the receiving and transmitting functions may be separate or integrated together. The above-mentioned transceiver circuits, interfaces or interface circuits may be used for reading and writing codes/data, or the above-mentioned transceiver circuits, interfaces or interface circuits can be used for signal transmission or transfer.

In an implementation, the processor 1801 may store a computer program 1803. When the computer program 1803 is running on the processor 1801, the communication device 1800 is caused to perform the method described in the above method embodiments. The computer program 1803 may be solidified in the processor 1801, in which case the processor 1801 may be implemented in hardware.

In an implementation, the communication device 1800 may include a circuit that may implement the function of sending or receiving or communicating in the foregoing method embodiments. The processors and transceivers described in the disclosure may be implemented on integrated circuits (ICs), analog ICs, radio frequency integrated circuits (RFICs), mixed-signal ICs, application specific integrated circuits (ASICs), printed circuit boards (PCBs), electronic devices, etc. The processor and transceiver may also be manufactured using various IC process technologies, such as a complementary metal oxide semiconductor (CMOS), a nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be a network device or a terminal device (such as the first terminal device in the foregoing method embodiments), but the scope of the communication device described in the disclosure is not limited, and the structure of the communication device can be not limited by FIG. 18. The communication device may be a stand-alone device or may be part of a larger device. For example, the communication device may be:

(1) an independent integrated circuit IC, or a chip, or a chip system or a subsystem;

(2) a collection of one or more ICs. Optionally, the IC collection may also include storage components for storing data and computer programs;

(3) ASIC, such as modem;

(4) modules that can be embedded in other devices;

(5) a receiver, a terminal device, an intelligent terminal device, a cellular phone, a wireless device, a handheld device, a mobile unit, a vehicle-mounted device, a network device, a cloud device, an artificial intelligence device, etc.;

(6) Others, etc.

Figure 19:
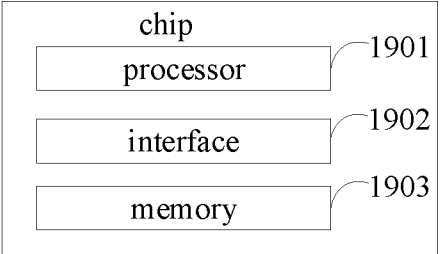
FIG. 19 is a structural diagram of a chip according to an embodiment of the present disclosure.

For the case where the communication device may be a chip or a chip system, refer to the structural diagram of the chip shown in FIG. 19. The chip shown in FIG. 19 includes a processor 1901 and an interface 1902. The number of processors 1901 may be one or more, and a number of interfaces 1902 may be multiple.

For the case where the chip is used to implement the functions of the network device in the embodiments of the disclosure, such as the PCF network element, the processor 1901 is used to execute the step S101 in FIG. 1, the step S2012 in FIG. 2, the step S3011 in FIG. 3, the step S401 in FIG. 4, the step S501 in FIG. 5, the step S601 in FIG. 6, and the step S701 in FIG. 7. The processor 1901 is configured to execute, via the interface 1902, the step S102 in FIG. 1, the steps S2011 and S202 in FIG. 2, the step S302 in FIG. 3, the S4021 in FIG. 4, the step S50211 in FIG. 5, the steps S60211-S60213 in FIG. 6, and the step S7021 in FIG. 7.

For the case where the chip is used to implement the functions of the network equipment in the embodiment of the disclosure, such as the BSF network element, the processor 1901 is used to execute, via the interface 1902, the step S802 in FIG. 8, the step S9021 in FIG. 9, the step S10021 in FIG. 10, the step S11021 in FIG. 11 and the steps S1202-S1203 in FIG. 12. The processor 1901 is configured to execute the step S801 in FIG. 8, the step S901 in FIG. 9, the step S1001 in FIG. 10, the S1101 in FIG. 11, and the step S1201 in FIG. 12.

For the case where the chip is used to implement the functions of the network device in the embodiment of the disclosure, such as the AF network element, the processor 1901 is used to execute the step S1301 in FIG. 13 via the interface 1902.

Optionally, the chip also includes a memory 1903, which is used to store necessary computer programs and data.

Those skilled in the art may also understand that the various illustrative logical blocks and steps listed in the embodiments of the disclosure may be implemented by electronic hardware, computer software, or their combination. Whether such functionality is implemented in hardware or software depends on a specific application and overall system design requirements. Those skilled in the art may use various methods to implement the described functions for each specific application, but such implementation should not be understood as going beyond the protection scope of the embodiments of the disclosure.

The embodiment of the disclosure also provides a system for selecting a PCF network element. The system includes any combination of a communication device as the PCF network element in the aforementioned embodiments of FIG. 14 to FIG. 15, a communication device as the BSF network element in the aforementioned embodiment of FIG. 16, and a communication device as the AF network element in the aforementioned embodiment of FIG. 17. Alternatively, the system includes a communication device as network device in the embodiment of FIG. 18.

The disclosure also provides a readable storage medium on which instructions are stored, and when the instructions are executed by a computer, the functions of any one of the above method embodiments are implemented.

The disclosure also provides a computer program product, which implements the functions of any one of the above method embodiments when executed by a computer.

In the above embodiments, it may be implemented in whole or in part by software, hardware, firmware, or any combination. When implemented in software, it may be implemented in whole or in part in the form of a computer program product. The computer program product includes one or more computer programs. When the computer program is loaded and executed on a computer, the processes or functions described in the embodiments of the disclosure are generated in whole or in part. The computer may be a general-purpose computer, a special-purpose computer, a computer network, or other programmable device. The computer program may be stored in or transferred from one computer-readable storage medium to another. For example, the computer program may be transferred from a website, a computer, a server, or a data center to another web site, another computer, another server or another data center through a wired means (such as a coaxial cable, an optical fiber, a digital subscriber line (DSL)) or a wireless means (such as infrared, wireless, microwave, etc.). The computer-readable storage medium may be any available medium that can be accessed by a computer or a data storage device such as a server, a data center, etc. that contains one or more available media integrated. The available media may be magnetic media (e.g., a floppy disk, a hard disk, a tape), optical media (e.g., a high-density digital video disc (DVD)), or semiconductor media (e.g., a solid state disk, SSD)) etc.

Those skilled in the art may understand that the first, second, and other numerical numbers involved in the disclosure are only for convenience of description and are not used to limit the scope of the embodiments of the disclosure and also indicate the order.

The term "at least one" in the disclosure can also be described as one or more, and "a plurality of" may be two, three, four or more, which is not limited by the disclosure. In the embodiments of the disclosure, for a technical feature, the technical feature is distinguished by "first", "second", "third", "A", "B", "C" and "D", etc. The technical features described in "first", "second", "third", "A", "B", "C" and "D" are in no particular order or size sequence.

As used herein, the terms "machine-readable medium" and "computer-readable medium" refer to any computer program product, device, and/or means for providing machine instructions and/or data to a programmable processor (for example, magnetic disks, optical disks, memories, programmable logic devices (PLDs)), including machine-readable media that receive machine instructions as machine-readable signals. The term "machine-readable signal" refers to any signal used to provide machine instructions and/or data to a programmable processor.

The systems and techniques described herein may be implemented in a computing system that includes back-end components (e.g., as a data server), or a computing system that includes middleware components (e.g., an application server), or a computing system that includes front-end components (e.g., a user computer having a graphical user interface or a web browser through which the user may interact with the implementations of the systems and technologies described herein), or a computing system including any combination of such backend components, middleware components, or front-end components. The components of the system may be interconnected by any form or medium of digital data communication (e.g., a communications network). Examples of the communication network include: a local area network (LAN), a wide area network (WAN) and the Internet.

The computer system may include clients and servers. The clients and servers are generally remote from each other and typically interact over a communications network. The relationship between the client and the server is created by computer programs running on corresponding computers and having a client-server relationship with each other.

It should be understood that various forms of the process shown above may be used, with steps reordered, added or deleted. For example, each step described in the present disclosure can be executed in parallel, sequentially, or in a different order. As long as the desired results of the technical solutions disclosed in the present disclosure can be achieved, there is no limitation here.

Those skilled in the art may be aware that the units and algorithm steps of each example described in conjunction with the embodiments disclosed herein can be implemented with electronic hardware, or a combination of computer software and electronic hardware. Whether these functions are executed in hardware or software depends on a specific application and design constraints of the technical solution. Those skilled in the art may implement the described functionality using different methods for each specific application, but such implementations should not be considered to go beyond the scope of the disclosure.

Those skilled in the art can clearly understand that for the convenience and simplicity of description, the specific working processes of the systems, devices and units described above may be referred to the corresponding processes in the foregoing method embodiments, which will not be repeated here.

The above are only specific embodiments of the disclosure, but the protection scope of the disclosure is not limited. Any person in the technical field may easily think of changes or substitutions within the technical scope disclosed in the disclosure, which should be covered by the protection scope of the disclosure. Therefore, the protection scope of the disclosure should be determined by the protection scope of the claims.

The invention claimed is:

1. A method for selecting a policy control function (PCF) network element, performed by a first PCF network element, the method comprising:

in response to a received policy association establishment request being related to a packet data unit (PDU) session of a user equipment (UE) within a UE group, obtaining a result of determining whether to select a same PCF network element serving each UE in the UE group for the PDU session of the UE;

in response to the result indicating a need of selecting the same PCF network element for the PDU session of the UE, requesting a binding support function (BSF) network element to select a same PCF network element for the PDU session of the UE;

sending a registration request associated with the PDU session of the UE to the BSF network element, wherein the registration request comprises a UE group identifier of the UE group;

receiving available PCF network element information fed back by the BSF network element, wherein the available PCF network element information is fed back when the BSF network element determines based on the registration request that the first PCF network element cannot serve as the same PCF network, and the available PCF network element information is related information of the same PCF network element; and feeding back the available PCF network element information to a session management function (SMF) network element.

2. The method according to claim 1, wherein determining whether to select the same PCF network element serving each UE in the UE group for the PDU session of the UE comprises:

obtaining a user description of the UE from a user data repository (UDR), wherein the user description indicates whether the UE is subscribed to a service requiring group policy coordination; and determining whether to select the same PCF network element for the PDU session of the UE based on the user description.

3. The method according to claim 1, wherein determining whether to select the same PCF network element serving each UE in the UE group for the PDU session of the UE comprises:

determining whether to select the same PCF network element for the PDU session of the UE based on a local policy in the first PCF network element, wherein the local policy indicates whether each UE belonging to a same UE group is served by a same PCF network element.

4. The method according to claim 1, wherein the UE group identifier is obtained by querying a user description of the UE stored in a user data repository (UDR).

5. The method according to claim 1, wherein requesting the BSF network element to select the PCF network element for the PDU session of the UE comprises:

in response to the result indicating no need of selecting the same PCF network element for the PDU session of the UE, requesting the BSF network element to select the first PCF network element for the PDU session of the UE.

6. A non-transitory computer storage medium having stored thereon computer-executable instructions, that when executed by a processor, is caused to implement the method according to claim 1.

7. A method for selecting a policy control function (PCF) network element, performed by a binding support function (BSF) network element, the method comprising:

receiving a registration request from a first PCF network element, wherein the registration request is related to a packet data unit (PDU) session of a user equipment (UE) within a UE group and wherein the registration request comprises a UE group identifier of the UE group; and selecting a same PCF network element serving each UE within the UE group for the PDU session of the UE based on the registration request;

wherein selecting the same PCF network element serving each UE in the UE group for the PDU session of the UE based on the registration request comprises:

in response to binding information comprising the UE group identifier being registered in the BSF network element and a PCF network element indicated in the registered binding information being not the first PCF network element, feeding back available PCF network element information to the first PCF network element, wherein the available PCF network element information is related information of the PCF network element indicated in the registered binding information.

8. The method of claim 7, wherein selecting the same PCF network element serving each UE in the UE group for the PDU session of the UE based on the registration request comprises:

in response to binding information comprising the UE group identifier being not registered in the BSF network element, registering the binding information comprising the UE group identifier and selecting the first PCF network element for the PDU session of the UE.

9. The method according to claim 7, wherein selecting the same PCF network element serving each UE in the UE group for the PDU session of the UE based on the registration request comprises:

in response to binding information comprising the UE group identifier being registered in the BSF network element and a PCF network element indicated in the registered binding information being the first PCF network element, selecting the first PCF network element for the PDU session of the UE.

10. The method according to claim 7, further comprising:

in response to the UE group identifier being carried in a received policy request related to an application function (AF) session of the UE within the UE group, selecting the same PCF network element for the AF session based on the UE group identifier.

11. A communication device, comprising: a transceiver; a memory; a processor, connected to the transceiver and the memory respectively, wherein the processor is configured to execute computer-executable instructions on the memory, to control a wireless signal transceiving of the transceiver and implement the method according to claim 7.

12. A first policy control function (PCF) network element, configured to:

in response to a received policy association establishment request being related to a packet data unit (PDU) session of a user equipment (UE) within a UE group, obtain a result of determining whether to select a same PCF network element serving each UE in the UE group for the PDU session of the UE; and in response to the result indicating a need of selecting the same PCF network element for the PDU session of the UE, request a binding support function (BSF) network element to select a same PCF network element for the PDU session of the UE;

send a registration request associated with the PDU session of the UE to the BSF network element, wherein the registration request comprises a UE group identifier of the UE group;

receive available PCF network element information fed back by the BSF network element, wherein the available PCF network element information is fed back when the BSF network element determines based on the registration request that the first PCF network element cannot serve as the same PCF network, and the available PCF network element information is related information of the same PCF network element; and feed back the available PCF network element information to a session management function (SMF) network element.

13. The first PCF network element according to claim 12, further configured to:

obtain a user description of the UE from a user data repository (UDR), wherein the user description indicates whether the UE is subscribed to a service requiring group policy coordination; and determine whether to select the same PCF network element for the PDU session of the UE based on the user description.

14. The first PCF network element according to claim 12, further configured to:

determine whether to select the same PCF network element for the PDU session of the UE based on a local policy in the first PCF network element, wherein the local policy indicates whether each UE belonging to a same UE group is served by a same PCF network element.

15. The first PCF network element according to claim 12, wherein the UE group identifier is obtained by querying a user description of the UE stored in a user data repository (UDR).

16. The first PCF network element according to claim 12, further configured to:

in response to the result indicating no need of selecting the same PCF network element for the PDU session of the UE, request the BSF network element to select the first PCF network element for the PDU session of the UE.

* * * * *